United States Patent [19]

Hirschmann

[11] Patent Number: 4,621,434

[45] Date of Patent: Nov. 11, 1986

[54] MULTIPLE-COORDINATE SCANNER WITH REGULATED SCANNING FORCE

[75] Inventor: Karl-Heinz Hirschmann, Stuttgart, Fed. Rep. of Germany

[73] Assignee: Willy Höfler, Karlsruhe, Fed. Rep. of Germany

[21] Appl. No.: 639,288

[22] Filed: Aug. 10, 1984

[51] Int. Cl.⁴ .............................................. G01B 7/03
[52] U.S. Cl. ...................................... 33/503; 33/558; 33/1 M
[58] Field of Search .............. 33/1 M, 169 R, 172 E, 33/174 L, 174 P, 174 PC, 179.5 R, DIG. 13

[56] References Cited

U.S. PATENT DOCUMENTS

| | | | |
|---|---|---|---|
| 3,869,799 | 3/1975 | Neuer et al. | 33/174 L |
| 3,883,956 | 5/1975 | Zeewy et al. | 33/174 L |
| 3,945,124 | 3/1976 | Jacoby et al. | 33/172 E |
| 4,078,314 | 3/1978 | McMurtry | 33/172 E |
| 4,130,941 | 12/1978 | Amsbury | 33/174 L |
| 4,228,591 | 10/1980 | Sterki et al. | 33/174 L |

FOREIGN PATENT DOCUMENTS

| | | | |
|---|---|---|---|
| 2232858 | 1/1973 | Fed. Rep. of Germany | 33/174 L |
| 35252 | 3/1980 | Japan | 33/174 L |
| 2067762 | 7/1981 | United Kingdom | 33/179.5 R |

Primary Examiner—Richard R. Stearns
Attorney, Agent, or Firm—Edwin E. Greigg

[57] ABSTRACT

A multiple-coordinate scanner having regulated scanning force for scanning objects, and preferably for length- and gear-measuring machines, is disclosed. The scanner detects the scanning force via a multiple-coodinate force measuring device and uses it to regulate the scanning force, in that corresponding straight-line guides in the multiple-coordinate scanner are deflected by drive units such that the resultant measuring force corresponds to a predetermined magnitude, regardless of the direction and magnitude of the multiple-coordinate scanner deflection.

7 Claims, 7 Drawing Figures

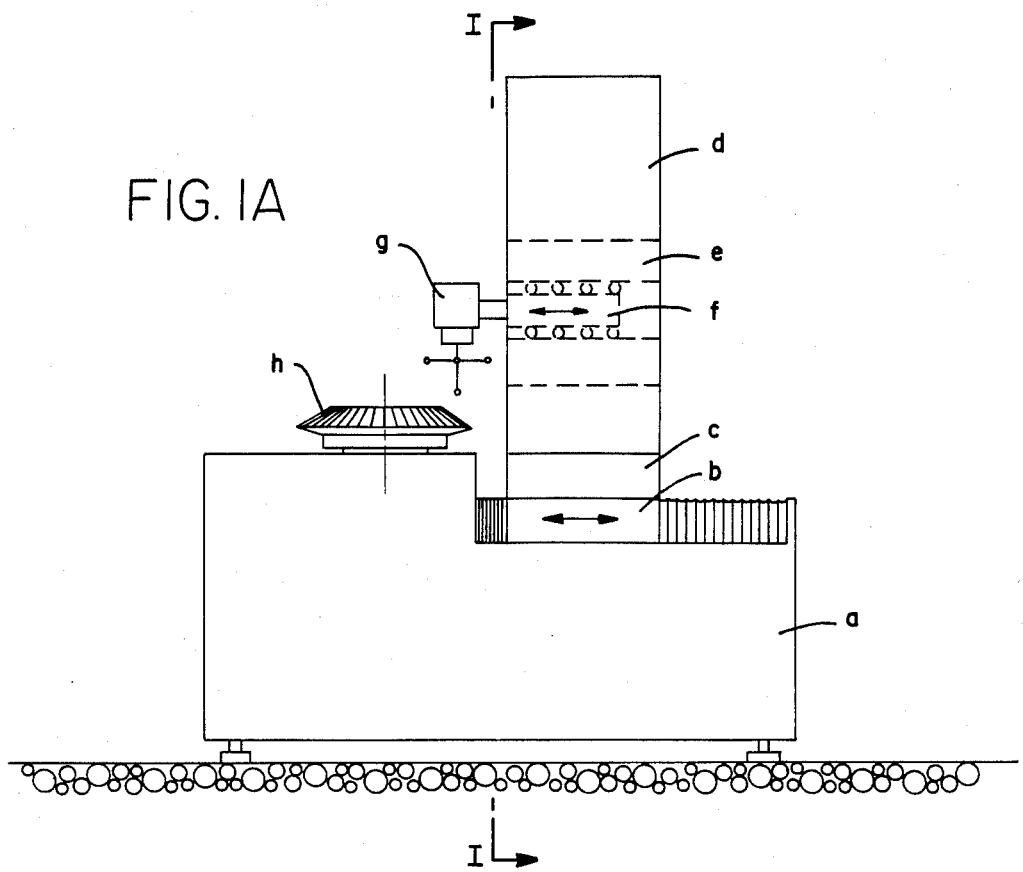
FIG. IA
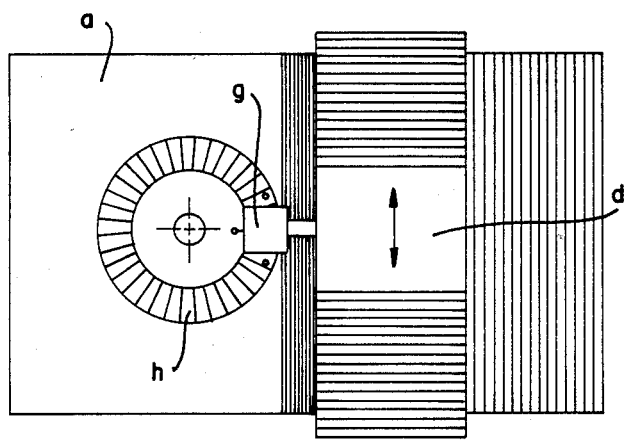
FIG. IB
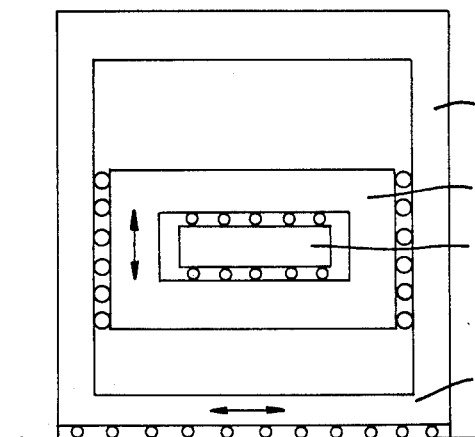
FIG. IC

MULTIPLE-COORDINATE SCANNER WITH REGULATED SCANNING FORCE

BACKGROUND OF THE INVENTION

The invention relates to a multiple-coordinate scanner with regulated scanning force for scanning objects. With this scanner, the precise location of the scanned point on the object can be ascertained. The scanner is preferably used in multi-dimensional length-measuring apparatus. The multiple-coordinate scanner can be used in combination with a measuring machine for scanning and measuring arbitrarily curved three-dimensional surfaces such as are used in gear manufacturing.

Multiple-coordinate scanners are known (German Pat. No. 22 42 355), the structure of which comprises a torsionally rigid succession of straight-line guides, each of which is associated with a travel measuring system. The measuring force is generated via plunger coils, or dynamic coils, independently of the force actually occurring, and is therefore subject to certain fluctuations. The accuracy of the measurement is affected by these fluctuations, as by the different flexions of the measuring system. The degree of possible deflection of the measuring scanner is thus severely restricted. Because of its necessarily rigid embodiment the measuring machine has large masses that must be moved, the restricted deflectability also severely restricts the speed of deflection, which results in measuring times of considerable length.

The location of the scanning point of the scanning ball on the object is indirectly determined from the magnitude of the deflection of the individual straight-line guides.

OBJECT AND SUMMARY OF THE INVENTION

It is accordingly an object of the invention to develop a multiple-coordinate scanner with regulated scanning force which is capable of detecting relatively large deflections at a constant measuring force, and with which the location of the scanning point of the scanning ball on the object can be ascertained directly from the direction of the measuring force vector.

The object is attained in accordance with the invention in that a multiple-coordinate scanner is designed with straight-line guides, including not only a travel transducer but also a drive element, with which the guides can be deflected. The amount of the deflection is regulated such that the resultant measuring force vector is constant in accordance with a predetermined variable. The amount of the deflection of the straight-line guides thus has no influence on the measuring force. The magnitude and direction of the measuring force is detected via a multiple-coordinate force measuring device disposed preceding the straight-line guides. From the magnitude of the force components in the individual coordinate axes, it is possible to ascertain directly the magnitude and direction of the force vector, and thus the location of the scanning point of the scanning ball on the object, because with friction-free contact of two faces, the vector of the contacting force is normal to the two faces, and all the surface normals of a ball pass through its center. In order to minimize the existing friction at engineering surfaces, or to minimize its influence, the same surface point can be scanned several times in such a way that one scanning operation is performed in the direction of the normal direction ascertained upon the previous scanning operation. This scanning can be effected by means of the drive elements incorporated into the straight-line guides. The process accordingly provides the surface normals that are important in gear manufacturing technology.

By means of the drive mechanisms, and in combination with regulating the measuring force, the scanning speed can then be increased as well, because of the small masses of the scanning head, since the multiple-coordinate scanning head is itself capable of rapidly following the surface of the object to be scanned, independently of the movements of the sluggish carriage of the measuring machine. For the movement of the multiple-coordinate scanner itself, the guide variable is the measuring force, while the guide variable for the movement of the measuring machine carriage is the deflection of the scanning head. Once the multiple-coordinate scanner has been placed against the surface of the object and the means of force regulation is in operation, then the measuring scanner follows along the surface as long as certain limit speeds are not exceeded by the measuring machine carriage, or as long as the surface itself does not have an excessive curvature. Furthermore, errors resulting from deformation of the scanner and measuring machine can be compensated for on the basis of the magnitude and direction of the measuring force, given a known (that is, measured, for instance) rigidity of the multiple-coordinate scanner and the measuring machine.

Connecting the straight-line guides in sequence can also be effected such that the spring parallelograms are nested inside one another. Because of the regulation, the necessarily different dimensions of the spring parallelograms have no effect on the measuring force. The travel transducers and the drive elements are then disposed outside the spring parallelograms.

The drive elements may be electric, hydraulic or pneumatic linear motors, which are triggered by electrical signals. Corresponding rotator drives can also be used, however, if the rotational movement is converted into a linear movement and a speed reduction is simultaneously introduced. Known gear mechanisms cannot be used, among other reasons because of their inertial masses and their play. A suitable mechanism for this purpose is one comprising a narrow, thin belt or cable, which is twisted by the drive motor and by its helical deformation is shortened in length. One end of the belt is connected to the measuring scanner, and the other to the measuring scanner base. The advantages of this mechanism are its low mass, the play-free reversal of the drive direction and the simplicity of deflecting the belt in another direction.

For applications where the demands for measuring speed and accuracy are less stringent, the straight-line guides with the travel measuring devices can be dispensed with either wholly or in part. The measuring force must then be kept constant via the coordinate axis drive mechanisms of the measuring machine.

Instead of the direct force measuring device, a further travel measuring device can also be used, its deflection being converted into a corresponding measuring force.

For travel and force absorbers, known processes can be used. The signal processing is initially done in an analog manner and then digitally in a subsequent computer. The computer also takes on the task of extensively automating the course of measurement, together with the measuring machine.

BRIEF DESCRIPTION OF THE DRAWING

FIG. 1a–c illustrate respective side, plan, and sectional views of the scanner shown in FIG. 1;

DESCRIPTION OF THE PREFERRED EMBODIMENT

Figure 1:
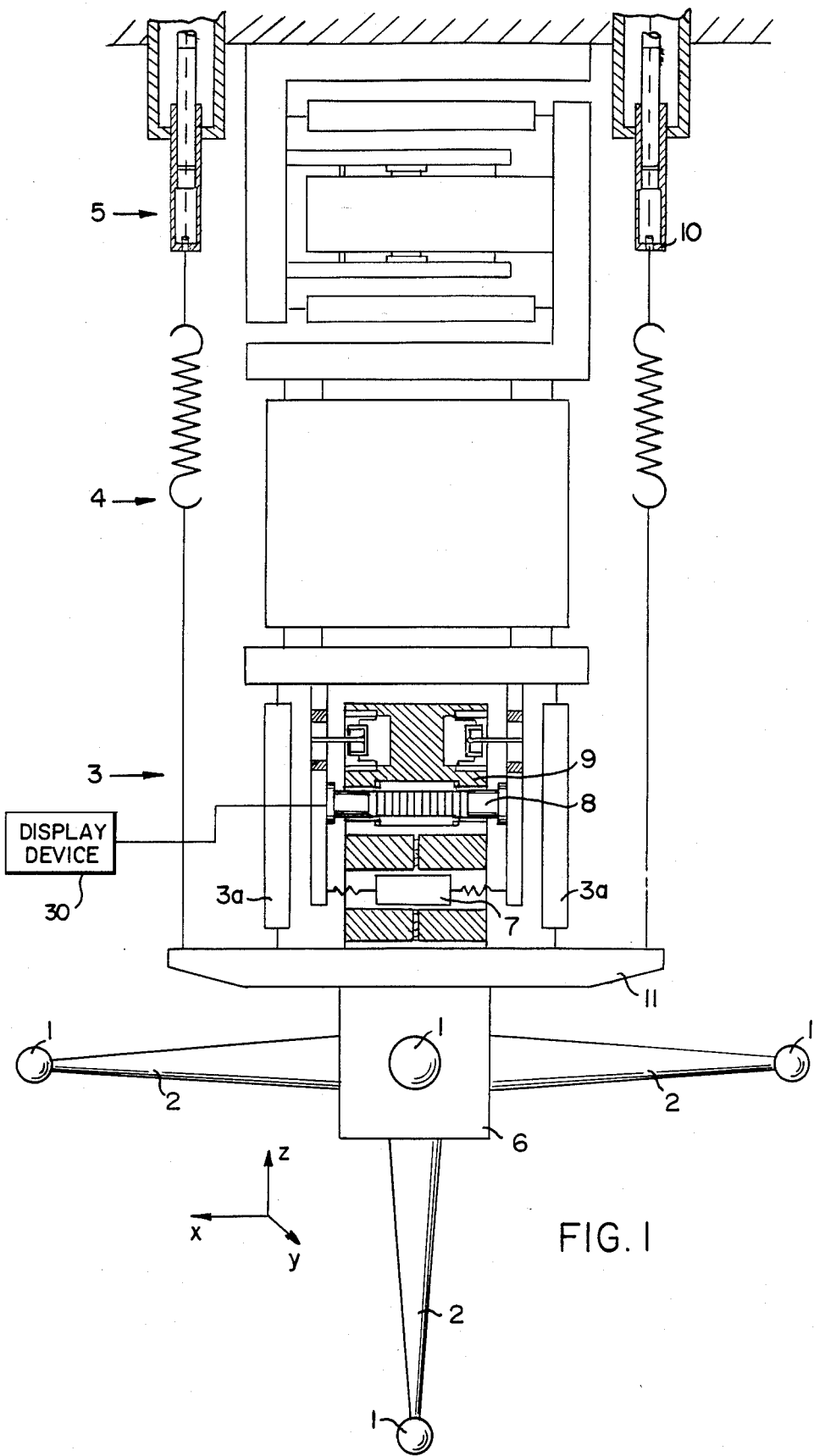
FIG. 1 shows the basic structure of the multiple-coordinate scanner with regulated scanning force according to the invention.

FIG. 1 shows the fundamental structure of the multiple-coordinate scanning head having three spring parallelogram units 3, 4 and 5, which are disposed such that they can perform a measuring movement in the directions of the coordinate axes of a rectangular, cartesian coordinate system. Each of the spring parallelogram units has an identical embodiment, but they are each in turn rotated by 90° relative to one another. Element 3 provides the positioning operation for the X direction; element 4 provides the positioning operation, rotated by 90° relative to that, for the Y direction; and element 5 furnishes the positioning operation, now rotated by 90° relative to the Y direction, for the Z direction. As explained below, these three positioning operations are carried out until such time as the scanning approach force of the scanner at the tooth flank corresponds to the value $F_{set\ point}$. As shown for the spring parallelogram unit 3, they comprise the actual spring parallelogram 3a, the drive unit 7, the travel transducer 8 and an oscillation damper 9. The object to be measured is touched by one of the balls 1, which is connected via the rod 2 with the multiple-coordinate force measuring device 6. The measuring force generated by the touch is detected by the multiple-coordinate force measuring device 6 in the same direction as that of the motions permitted by the three spring parallelogram units 3, 4 and 5.

The measuring force components detected in the individual coordinate directions are added up to make the resultant total measuring force and then compared with the measuring force required. Deviations from the latter are compensated for in the X direction by the drive unit 7, in this case by way of example an electric linear motor.

The compensation in the Y and Z directions is effected by corresponding drive units in the spring parallelogram units 4 and 5.

The multiple-coordinate force measuring device 6 is connected via the base plate 11 with the spring parallelogram units 3, 4 and 5. The deflection of the scanning tip 1 is thus transmitted to the travel transducer 8 for the X direction and detected. Corresponding travel transducers for the Y and Z directions are contained in the spring parallelogram units 4 and 5. Thus in combination with the coordinate system of the measuring machine, the position of the center of the scanning ball is determined by means of addition using the correct algebraic sign (i.e., + or −). The measuring force remains constant because of the regulation, regardless of the parallelogram deflection.

For compensating for weight in the Z direction, the base plate 11 is suspended via spring suspensions and adjusting screws 10. According to FIG. 1, the apparatus is suspended via springs and adjusting screws 10. This is applicable to an apparatus such as that shown in FIGS. 1a–c, below. If the apparatus is not suspended but is instead disposed horizontally, then natural the means for supporting its weight should be 20 given another direction accordingly.

According to FIGS. 1a–c, there is a machine frame a, on which a carriage b is displaceable as indicated by the arrows in FIG. 1a. This direction of displacement is the X direction. A carriage c is displaceable on the carriage b, transversely thereto, as indicated by the arrows in FIG. 1b. This in the Y direction. The carriage c supports a frame d. In the frame d, a carriage e is vertically displaceable as indicated by the arrows in FIG. 1c. This is the Z direction. A carriage f is displaceable in the carriage e as indicated by the arrows in FIG. 1a. This is the X direction again. The carriage f carries the measuring head g, which is shown in its entirety in FIG. 1.

With the aid of the carriage b, the measuring head g is moved into a usable position with respect to one flank of the gear wheel h. Then the carriage b is clamped together with the machine frame a. Further movements in the X, Y and Z directions are executed by the carriages c, e and f, so that only the smallest possible masses will have to be moved.

Now the scanner of the measuring head g is brought into contact with one flank of the gear wheel h, which is done by moving the flank toward the scanner by rotating the gear wheel h. Since the scanner is aligned relative to the center of rotation of the gear wheel, one point of the surface (gear flank) that is to be tested and that is known in the computer of the measuring machine is thus ascertained. This surface of the tooth flank that is known in the computer is the set-point surface, which is now approached at several points for measurement or testing by the scanner, in order to ascertain whether the actual position of the scanner deviates from the set-point position, and if so, how great the deviation (error) is.

The invention described herein has the object of keeping the scanning approach [i.e., the force as the scanner approaches what is scanned] of the measuring scanner constant for the various measurement points, that is, keeping it independent of how large the deviation of the actual position of the scanner is from the set-point position stored in the computer.

Figure 2:
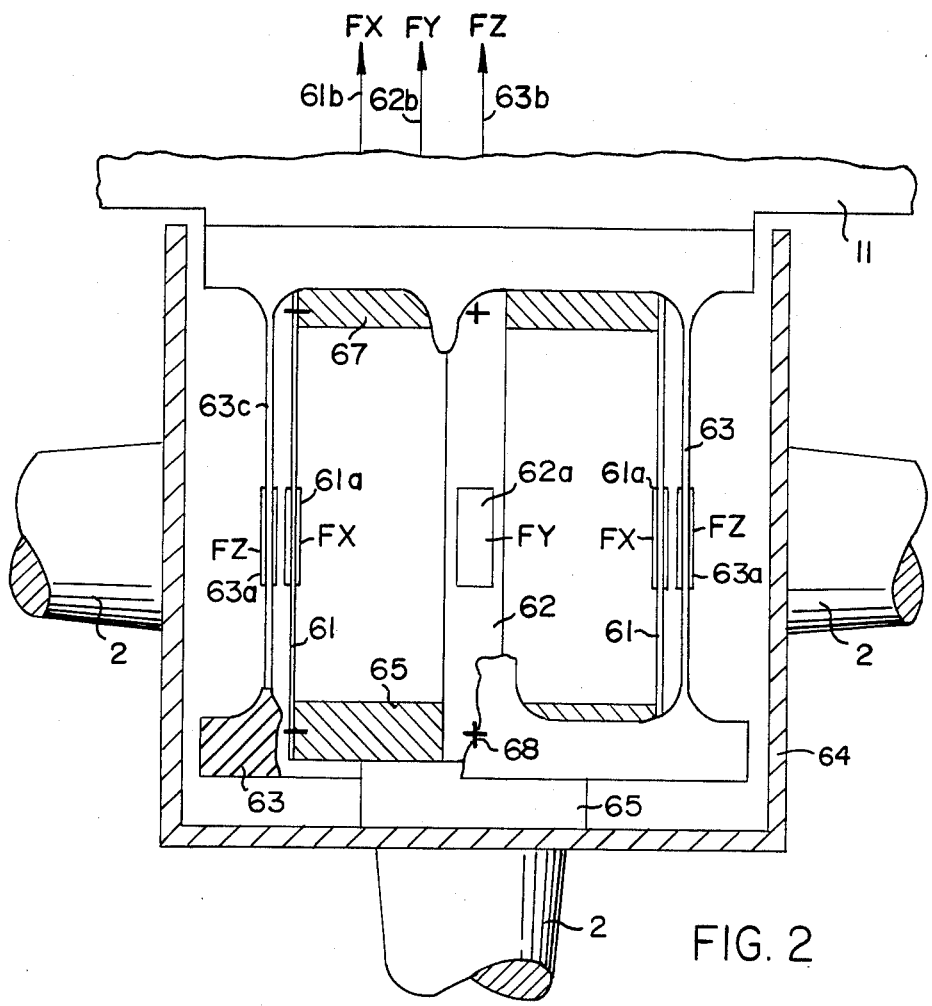
FIG. 2 shows the basic structure of the multiple-coordinate force measuring device.

FIG. 2 shows the fundamental structure of the multiple-coordinate force measuring device which in the present instance comprises three interleaved force measuring devices 61, 62 and 63.

The measuring force that is exerted is transmitted via the rods 2 to the housing 64, via the connecting plate 65 to the base plate 66 for the X force measuring device. The X force measuring device measuring two bending beams 61, which are connected via the intermediate plate 67 to make a spring parallelogram. Measured-value transducers which are sensitive to expansion or strain are disposed on the bending beams 61, and in combination with known intermediate electrical circuits these transducers furnish an electrical signal FX 61b which is proportional to the effective force component FX of the measuring force. Correspondingly, the force component 62b is measured via the spring parallelogram 62 and the measured-value transducer 62a. The bending beams 62 are connected at 68 with the Z force measuring device 63, which here is represented by a crusher gauge, of which only struts rotated relative to one another by 90° are used, and on which the measured-value transducers 63a are disposed, which furnish the signal FZ 63b. The Z force measuring device 63 is connected to the base plate 11. The measured-value transducers are connected such that undesired force components and moments cancel each other out.

Figure 3:
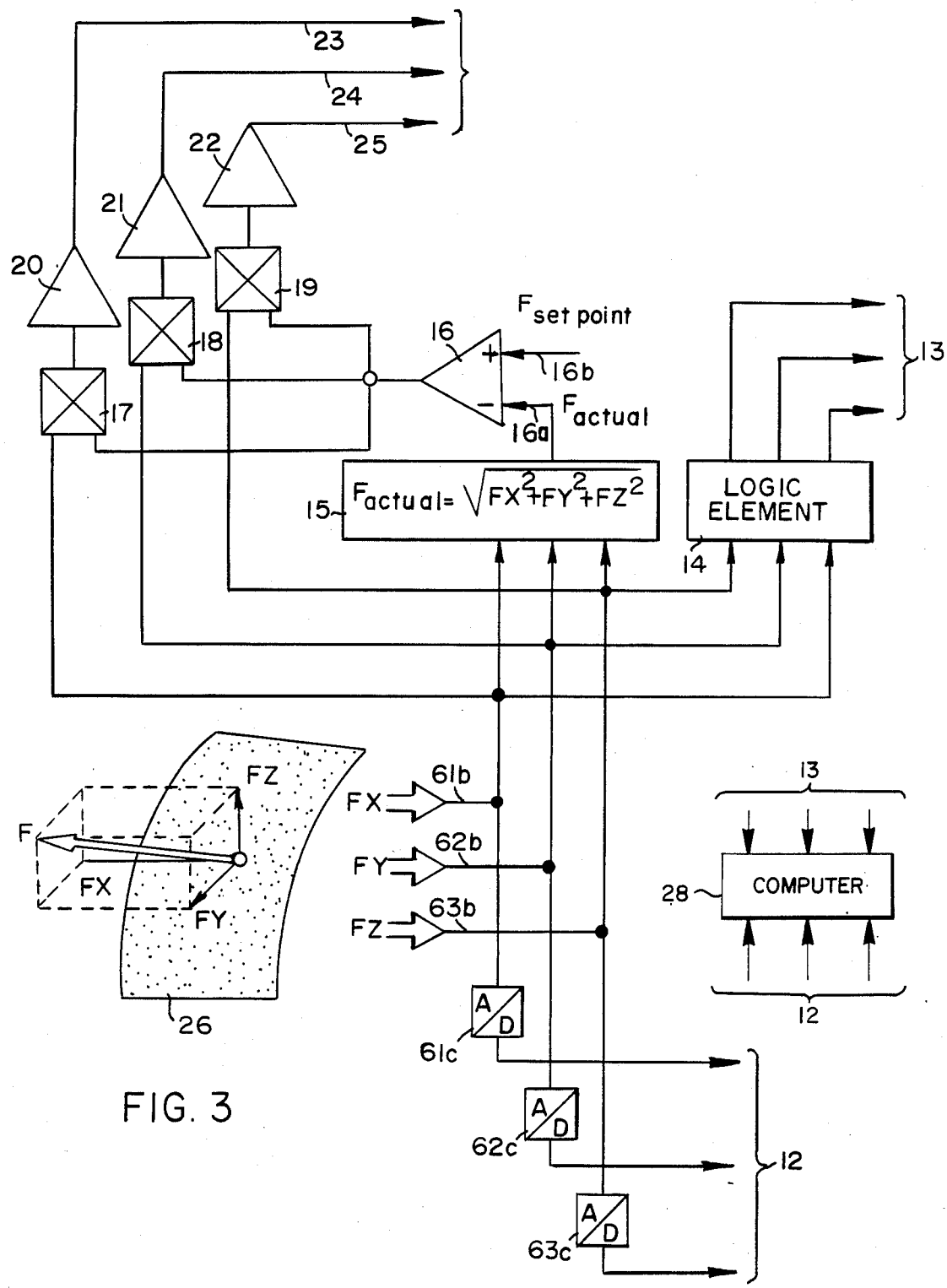
FIG. 3 is a block circuit diagram of the electrical force regulation and shows its connection with the computer.

FIG. 3 shows a block circuit diagram of the electrical force regulation and the transmission of data to the computer 28. The multiple-coordinate force transducer, upon scanning the object 26, furnishes the electrical signals FX 61b, FY 62b and FZ 63b. The signals 61b, 62b and 63b are sent on the one hand via the analog-/digital converters 61c, 62c, 63c to the computer 26 via the lines 12 and evaluated together with the signals of the algebraic-sign logic element 14, which is connected with the computer 26 via the lines 13. The computer 26 furnishes the magnitude and direction of the measuring force vector F and thus the location of the scanning point of the measuring ball on the object 26 and the direction of the normals to the surface at the point being scanned. On the other hand, via the computer circuit 15, the amount of the measuring force vector is ascertained and compared in the comparator 16 with the required measuring force. The deviation is multiplicatively linked in the circuits 17, 18 and 19 with the measuring force components 61b, 62b and 63b and delivered to the output amplifiers 20, 21 and 22, which via the lines 23, 24 and 25 supply the drive units in the spring parallelogram units with energy.

If a set-point position of the gear flank is approached by the scanner according to FIGS. 1 and 2 with the aid of the carriages c, e and f, then the scanner is transferred to an actual position which via the multiple-coordinate force measuring device according to FIG. 2 furnishes certain values 61b, 62b, and 63b. These values, according to FIG. 3, define a measuring force $F_{actual}$, which is compared with the adjustable or preselectable measuring force $F_{set\ point}$. If there is a deviation, then for the three coordinate directions at the spring parallelogram units 3, 4 and 5 of FIG. 1, a followup adjustment is performed in the three coordinate directions with the aid of the various drive devices 7 until such time as the value $F_{actual}$ corresponds to $F_{set\ point}$. This followup adjustment by the drive units 7 causes incremental travel transducers 8, one of which is present at each of the spring parallelogram units 3, 4, 5, to execute deflections, which can be detected as measurement values and displayed by a display device 30.

It should be understood that the value $F_{set\ point}$ at the incremental travel transducers 8 already causes a certain deflection, which corresponds to a previously selected zero value. If this basic deflection were not present, then the scanner would rest on the flank without any force; that is, the value $F_{set\ point}$ would equal zero, which naturally is not usable in practical terms. A value $F_{set\ point}$ is therefore selected as a desired contacting force of the scanner on the flank. A predetermined deflection of the incremental travel transducer 8 corresponds to this desired value $F_{set\ point}$. Deviations from this deflection, resulting at an individual measuring point because the value $F_{actual}$ is made to match the value $F_{set\ point}$ with the aid of the drive units 7, represent the measured value (error). If the subject of FIG. 1, that is, reference numerals 3, 4 and 5, is omitted, then the controlling of the carriages c, e and f is undertaken directly based on the multiple-coordinate force measuring device 6. That is, in that case the carriages c, e and f would be used not only for approaching the various measurement points in sequence with the scanner, but additionally for executing the positioning movements, which in the case shown by illustration in FIG. 1 are performed by the spring parallelogram units 3, 4 and 5, so that the desired scanner force $F_{set\ point}$ will be attained.

Figure 4:
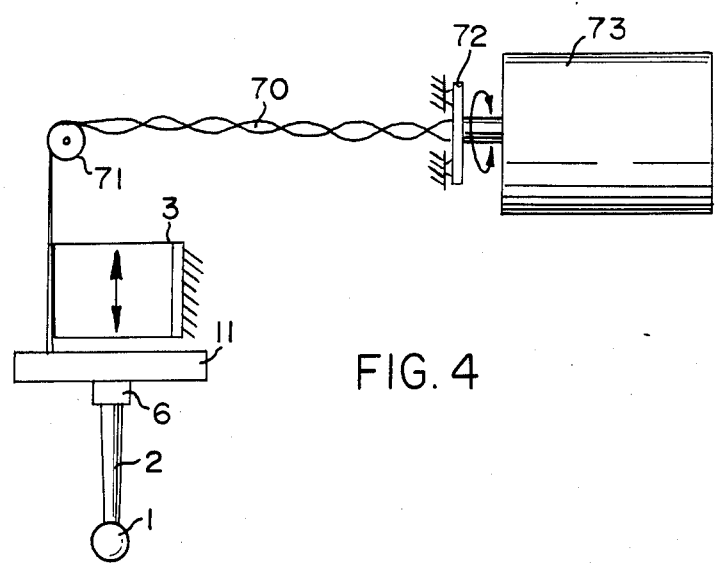
FIG. 4 is a schematic illustration of the rotator drive mechanism with belt drives and a scanner pin.

FIG. 4 is a schematic illustration of the rotator drive having a belt drive 70, a scanner and a spring parallelogram 3 for one coordinate axis. The drive motor 73 transmits its rotational movement to the thin belt 70, thereby twisting it and shortening its length. In the axial bearing 72 the belt is fixed in the longitudinal direction, so that the shortening can be transmitted via the base plate 11, the force measuring device 6 and the rod 2 to the ball 1. If it should be required, the thin belt can also be diverted over a roller 71, as shown.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. An electronic multi-coordinate scanner having a scanning head (g) having at least one scanner (1,2) for progressively scanning a multi-dimensional article (h) from one measuring position to another measuring position on coordinate measuring machines, wherein said scanning head includes a torsionally rigid sequential arrangement of straight-line X, Y and Z guide systems (3,4,5) free of play and friction which with one another form a definite, two- or three-dimensional coordinate system, and further includes signal transducers for each X-Y-Z guide system which indicate the scanner deflection, which likewise represent a torsionally rigid coordinate system, and is provided with means for electronically controlling generation of definite measuring forces of the scanner, which comprises a multi-coordinate measuring force device (6) including signal transducers disposed between scanners (1,2) and said straight-line X, Y, Z guide systems (3,4,5); each of said straight-line X,Y,Z guide system includes an electronically controlled adjusting member (7) for adjusting each said guide system within its range of movement of measuring force generation; and each straight-line X,Y,Z guide system is provided with a travel transducer (8) for indicating a deflected position of each said guide system; a computer for receiving signals from said signal transducers in accordance with the individual coordinates of said scanner and comparing said signals with a predetermined set-point value and deviation between these values are converted to output signals, adjusting members 7 associated with each of said X,Y,Z guide systems for adjusting said X,Y,Z guide system in accordance with said outputs signals received from said computer, and said travel transducers produce output signals which are directed to a display device for indicating the contour of said article.

2. A multi-coordinate scanner as defined by claim 1, characterized in that the adjusting members (7) are linear motors.

3. A multi-coordinate scanner as defined by claim 2, characterized in that the straight-line guide systems (3,4,5) are spring parallelograms.

4. A multi-coordinate scanner as defined by claim 1, characterized in that the straight-line guide systems (3,4,5) are spring parallelograms.

5. A method for measuring multi-dimensional articles by means of a multi-coordinate scanner having an adjustable measuring force, characterized in that upon each measurement step, the initially appearing resultant measuring force is ascertained as to magnitude and direction and is used to establish a predetermined, final measuring force by means of actuation of adjusting means for the scanner, such that a final resultant measuring force corresponds in magnitude and direction to a predetermined resultant measuring force; and that set movements of said means are emitted as scanner measured values.

6. A method as defined by claim 5, characterized in that from the measuring force components, the direction of a measuring force vector and hence the location of the point of contact of the scanner with the article that is to be measured is ascertained.

7. A method as defined by claim 5, characterized in that one measuring point is scanned a plurality of times, each in the direction of the resultant measuring force which direction was ascertained upon the previous scanning operation.

* * * * *